United States Patent [19]
Staheli

[11] Patent Number: 6,109,008
[45] Date of Patent: Aug. 29, 2000

[54] METHOD AND DEVICE FOR HAY PRODUCTION

[76] Inventor: David H. Staheli, 1280 W. 3695 North, Cedar City, Utah 84720

[21] Appl. No.: 08/450,867

[22] Filed: May 26, 1995

[51] Int. Cl.[7] .................................................. A01D 78/18
[52] U.S. Cl. ..................... 56/10.2 B; 56/16.4 A; 56/16.4 B; 56/16.8; 56/DIG. 15
[58] Field of Search ............... 56/10.2 B, 16.8, 56/DIG. 15, 16.4 B, 16.4 A, DIG. 2, 341, 16.4 R; 239/172, 163, 754, 161; 100/47, 73, 74, 75, 88

[56] References Cited

U.S. PATENT DOCUMENTS

| | | | |
|---|---|---|---|
| 3,585,730 | 6/1971 | Morse | 56/DIG. 2 X |
| 3,690,559 | 9/1972 | Rudloff | 239/163 |
| 4,009,666 | 3/1977 | Russell et al. | 239/754 X |
| 4,254,605 | 3/1981 | Maher et al. | |
| 4,451,781 | 5/1984 | Anderson | |
| 4,495,033 | 1/1985 | Rathbun et al. | |
| 4,551,968 | 11/1985 | Samuelsson | 239/172 X |
| 4,604,857 | 8/1986 | Maher | 56/16.8 X |
| 4,812,741 | 3/1989 | Stowell | 56/DIG. 15 X |
| 4,817,870 | 4/1989 | Dalton | 239/172 X |
| 4,868,491 | 9/1989 | Black | |
| 4,873,772 | 10/1989 | Maher | 56/16.4 |
| 4,885,531 | 12/1989 | Stowell | |
| 4,916,888 | 4/1990 | Sheehan et al. | 56/DIG. 2 X |
| 4,942,717 | 7/1990 | Kozub | |
| 4,991,342 | 2/1991 | Maher et al. | |
| 5,010,809 | 4/1991 | Williams | |
| 5,022,317 | 6/1991 | Williams | |
| 5,060,459 | 10/1991 | Herron | 56/10.2 B |
| 5,327,708 | 7/1994 | Gerrish | 56/DIG. 2 X |
| 5,503,091 | 4/1996 | Foster et al. | 239/754 X |
| 5,540,143 | 7/1996 | Stromer et al. | 56/DIG. 2 X |

*Primary Examiner*—Christopher J. Novosad
*Attorney, Agent, or Firm*—Thorpe North & Western, LLP

[57] ABSTRACT

A method and device for harvesting hay are disclosed. The method includes positioning steam injectors into a windrow of hay and injecting steam into the windrow so as to permeate the windrow with steam and increase the moisture content of the hay. Preferably, the method also includes providing a plurality of injectors and moving the injectors up and down as they passed through the hay so as to evenly distribute steam throughout the windrow. The device includes a dew simulator having a water supply tank and a steam generation mechanism which is connected to a plurality of steam injection spikes. As the dew simulator moves along a windrow, the injector spikes emit steam throughout the windrow so as to achieve a consistent, desired moisture content in the hay.

25 Claims, 6 Drawing Sheets

METHOD AND DEVICE FOR HAY PRODUCTION

BACKGROUND OF THE INVENTION

The present invention relates to a method and device for hay production, and in particular, to a method and device for steam treating hay so as to achieve a consistent, desired moisture level in the hay.

In hay production operations, the producer is faced with numerous obstacles as he attempts to cut, cure, bale and store high quality feed. Weather, other atmospheric conditions and machinery requirements are a few of the major challenges which must be overcome in a successful harvest. Of the various types of hay, alfalfa is especially challenging due to the narrow range of moisture content which must be present in the hay when it is harvested using the bailing method.

In the past, after the hay was cut and sufficiently cured, hay producers were forced to rely upon the natural dew process to get proper moisture conditions for hay baling operations. Such was especially true for alfalfa and some other leafy, legume-type forages. This was typically done by waiting to bale the hay until the evening when falling temperatures cause dew to form on the hay. While considerable time was lost waiting for appropriate dew conditions to develop, crops were also often lost as, within a relatively short period of time, the dew forming on the hay was sufficient to reach an unacceptably high moisture content. The producer was then faced with the choice of waiting until the next day (and hoping that dew would form again) or to continue to bale and risk some spoilage of the hay.

To avoid such a choice, many producers have invested large sums of money in harvesting equipment to have sufficient equipment to harvest the hay within the brief window when moisture conditions are ideal. However, such large expenditures for equipment which remains idle for substantial amounts of time is extremely wasteful and decreases the producers financial productivity. Furthermore, even in the best of operations there is a significant percentage of hay crops which are either lost or heavily devalued due to moisture problems.

These problems are exacerbated in the more arid western United States and other areas of the world where atmospheric conditions prevent dew formations for prolonged periods of time. Baling the hay under completely dry conditions causes a huge loss of the most valuable leafy portion of the forage, the shattering of the stemmed portion, loss of protein and other feed values, extreme difficulty in loading, hauling and feeding and great losses in market value.

In attempts to overcome these concerns, some producers spray the windrows of hay with water. However, such attempts are unsuccessful because the water droplets are not easily absorbed into the dried hay. Additionally, only hay disposed on the outside of the windrow receives moisture. Thus, a natural dew-like condition cannot be achieved using this method.

In a more recent attempt to resolve these concerns, attempts were made to introduce moisture by placing the hay in a steam filled chamber which traveled along the windrows shortly before baling. An example of such attempts are contained in U.S. Pat. Nos. 4,254,605, 4,604,857, 4,873,772, and 4,991,342. These attempts recognized that steam is much more easily absorbed by the dry cured plant tissue than are small droplets of waters. By weight, steam has a volume of over 1000 times that of water. When a windrow of cured hay is subjected to steam, the steam instantly condenses onto the cool, dry plant tissue with which it comes into contact. This causes very rapid absorption of the water into the plant tissue.

The prior attempts to use steam, however, have not become widely accepted. By attempting to cover the hay in a container and then emit steam about the hay, these devices and methods resulted in insufficient penetration into the hay in the center of the windrow, and required that the hay be harvested at speeds much slower than currently available harvesting machines are capable of traveling.

Thus, prior to the present invention, there has been no viable method to bale hay with proper moisture levels other than to rely on natural dew formation. Because of this, only 30 to 40 percent of most producers' hay is acceptable as high grade feed, the most lucrative market. The remaining hay either spoils due to high moisture, or is sold for lesser amounts because of low moisture content. As will be discussed in detail below, the present invention enables producers to obtain consistent, high quality harvests without relying on natural dew formation, and without slowing the harvesting process.

SUMMARY OF THE INVENTION

Thus, it is an object of the present invention to provide a method for treating cured hay with steam so as to achieve a desired, consistent moisture content in the hay just prior to baling.

It is another object of the present invention to provide such a method which is easy to use and inexpensive.

It is yet another object of the present invention to provide a machine which steam treats hay by injecting steam into the windrows so as to ensure a consistent, desired hay moisture content.

It is still another object of the present invention to develop such a machine which is usable with conventional tractors and balers.

It is an additional object of the present invention to provide such a machine which allows the producer to vary the amount of steam being injected into the windrow so as to maintain consistent moisture content, even when the moisture content of the hay changes.

The above and other objects of the invention are realized in specific illustrated embodiments of a dew simulator including a steam generation mechanism which is disposed in communication with a plurality of steam injection spikes. As the dew simulator is passed along a windrow, the injection spikes cycle through the windrow of hay and emit steam into the windrow so as to simulate dew. Thus, the producer is able to achieve a desired moisture content in each bale of the harvested hay.

In accordance with one aspect of the invention, the dew simulator has sensors for detecting the moisture content of the hay and a regulator valve for controlling the amount of steam emitted into the hay so that an operator of the dew simulator is able to select the desired moisture content of the hay and maintain that moisture content, even if the original moisture content of the hay changes as one moves along the windrow.

In accordance with another aspect of the invention, the steam injection spikes are positioned on cam driven assemblies so that the spikes pass vertically through the windrow as the dew simulator travels along the windrow, thereby ensuring penetration of the windrow with a desired quantity of steam.

In accordance with another aspect of the invention, the dew simulator is positionable between a conventional tractor and baler, so as to prevent the need for replacing existing farm equipment.

In accordance with yet another aspect of the invention, a roller/plate is positioned in front of the dew simulator to compact the windrow prior to the injection of steam through the steam injection spikes, so as to decrease the volume of the windrow, and thereby decrease the amount of steam necessary to permeate the windrow.

In accordance with yet another aspect of the invention, a moisture sensor is provided and the regulator valve is programmed so as to be responsive to the moisture sensor so as to adjust to changing moisture content in the bales, and thereby maintain a generally consistent moisture content in the harvested hay.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
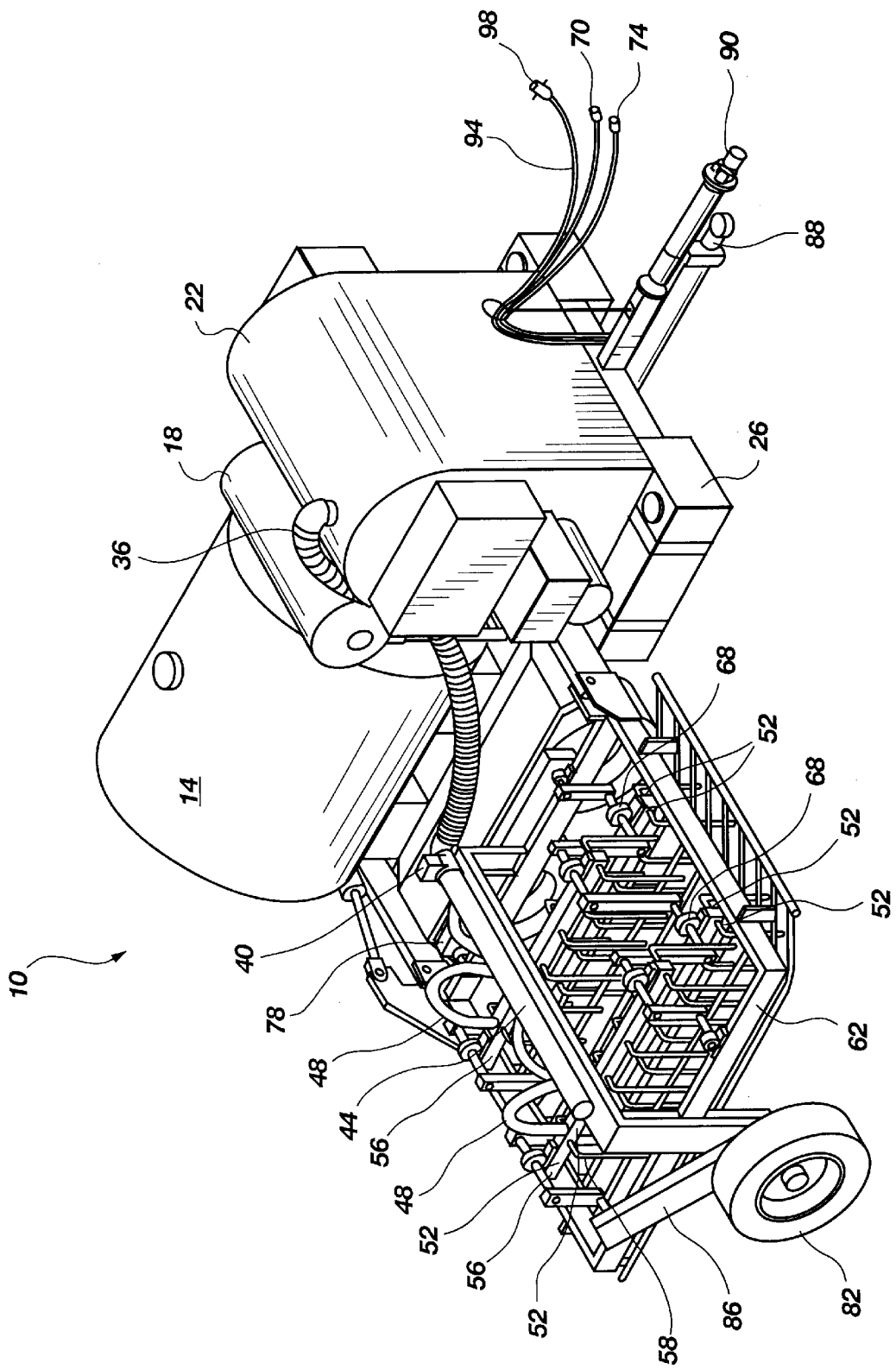
FIG. 1 shows a perspective view of a dew simulator having a boiler system, a water supply system and an injection system in accordance with the principles of the present invention.

Reference will now be made to the drawings in which the various elements of the present invention will be given numeral designations and in which the invention will be discussed so as to enable one skilled in the art to make and use the invention. Referring to FIG. 1, there is shown a dew simulator, generally indicated at 10, made in accordance with the principles of the present invention. The dew simulator 10 includes a water supply tank 14 for holding a large supply of water. In dry climates, as much as 30 to 100 pounds of steam is needed per ton of hay. Many baling machines have a capacity of 12–25 tons per hour. Thus, the water supply tank 14 should be sufficiently large to treat a considerable amount of hay before refilling of the tank is required.

Disposed adjacent to the water supply tank 14 is a boiler feedwater system 18. The boiler feedwater system 18 preheats water as it is pumped from the large supply tank to the steam generating boiler 22. Preheating the water removes excess oxygen and other corrosive gases from the water before it enters the boiler, thus greatly extending the life of the boiler and other components of the dew simulator 10.

Adjacent the boiler feedwater system 18 is a steam generator 22 for heating the water and forming steam. While the steam generator 22 could use electricity to generate the steam, such generators are generally too slow for the large quantities of steam needed for the present application. Thus, it is preferred to have the steam generator be fired by oil or some other petroleum product. The fuel for the steam generator 22 is generally supplied from a boiler fuel tank 26 disposed below the generator. Of course, the fuel could be contained on a tractor (not shown) which pulls the dew simulator 10, and supplied by a fuel line.

Steam generated by the steam generator 22 is released into a steam flow hose 36. Typically the steam flow hose 36 will be made of a durable, yet flexible material. The steam flow hose 36 leads to a steam regulator valve 40. The steam regulator valve 40 is disposed on the end of a steam manifold 44 and controls the amount of steam which is released into the manifold. Thus, the steam regulator valve 40 controls the amount of steam which is eventually released into the hay of the windrows (not shown). Of course, the steam regulator valve 40 may be manually controlled by an operator of the dew simulator 10, or may be connected to a device which senses the moisture content of the hay and adjusts the regulator valve accordingly. The steam regulator valve 40 may be any regulator valve which will withstand the temperatures of the steam, and which may be controlled to properly meter steam flow therethrough.

From the steam manifold 44, the steam is passed by a plurality of hoses 48 into a plurality of injector assemblies 52. The injector assemblies 52 include a channeling tube 56 and a plurality of steam injection spikes 58 (only one of which is marked in FIG. 1). The steam injection spikes 58 are generally hollow and are disposed along the channeling tube 56, so that steam from the hoses 48 passes through the channeling tubes 56 and out of a far end 58a (FIG. 2) of the injection spikes. Typically the channeling tubes 56 and the injection spikes 58 will be made of metal. However, other durable materials which will withstand the corrosive nature of the steam may also be used.

Each of the injector assemblies 52 are connected to the frame 62 of the dew simulator 10 by crankshafts 68. Power for driving the crankshafts 68 is provided by the wheel 82 which is attached to the crankshafts 68 by a timing mechanism 86 to ensure that the injection spikes 58 move at a rate synchronized to the speed at which the dew simulator 10 is traveling. The drive wheel 82 also supports the injector frames.

Also shown in FIG. 1 are a pair of hydraulic hoses 70 and 74 which raise or lower the injector frame 62 by a hydraulic ram 64. The hydraulic ram 64 can be used to raise the frame 62 to facilitate travel to and from a field of hay, and then to lower the frame into position when baling is to begin.

As the dew simulator 10 moves, the injection spikes 58 move up and down in a piston like fashion. Because of the crankshafts 68 and the movement of the dew simulator 10, the injector spikes 58 move in a somewhat cyclic pattern with each spike entering a windrow (not shown) disposed beneath the frame 62 at spacings of about six feet. Because the injector assemblies 52 are approximately six feet long, the entire length of the windrow is treated with steam. Preferably, the injector spikes 58 are approximately six to eight inches apart, thereby ensuring that the entire depth, breadth and length of each windrow becomes permeated with steam as the injector spikes cyclically move into and then out of the windrow.

It will be appreciated by those skilled in the art that the exact length and diameter of the channeling tubes 56 and the injector spikes 56 can vary. Smaller openings may be compensated for by applying the steam under a higher pressure. However, it is anticipated that each of the channeling tubes 56 will have an interior cross-sectional area of about 4 square inches, and the injector spikes 58 will have an interior diameter of about ⅜ths of an inch each.

Changeable nozzles 78 may be installed in the ends 58a of each injector spike 58 to facilitate pressure and volume adjustments. The interior diameter of each nozzle orifice should be between about ⅛th and ¼th of an inch.

Figure 3:
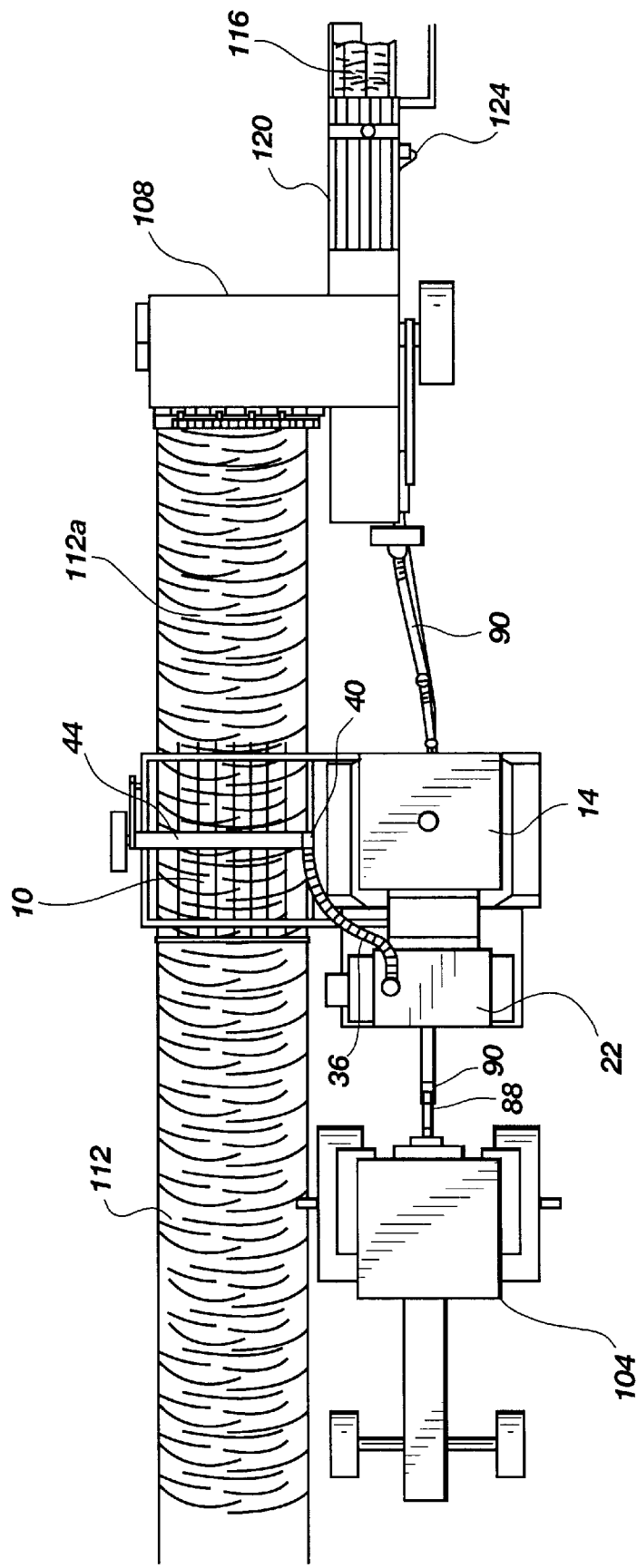
FIG. 3 shows a top view of a tractor, a dew simulator and a baler as used in accordance with the principles of the present invention.

The dew simulator 10 is pulled by a conventional hitch 88. However, it is preferable to also include a power transfer (PTO) shaft 90 so that power may be supplied to a baler (not shown) which follows the dew simulator 10 (FIG. 3). Those skilled in the art will be familiar with such shafts and their use.

Also shown in FIG. 1 is an electric cable 94 which is disposed adjacent the PTO shaft 90. The electric cable includes a plug 98 for connection with a tractor (not shown) or other machinery for pulling the dew simulator 10. The electric cable 94 supplies power for controls on the steam generator 22 and the steam regulator valve 40.

Figure 2:
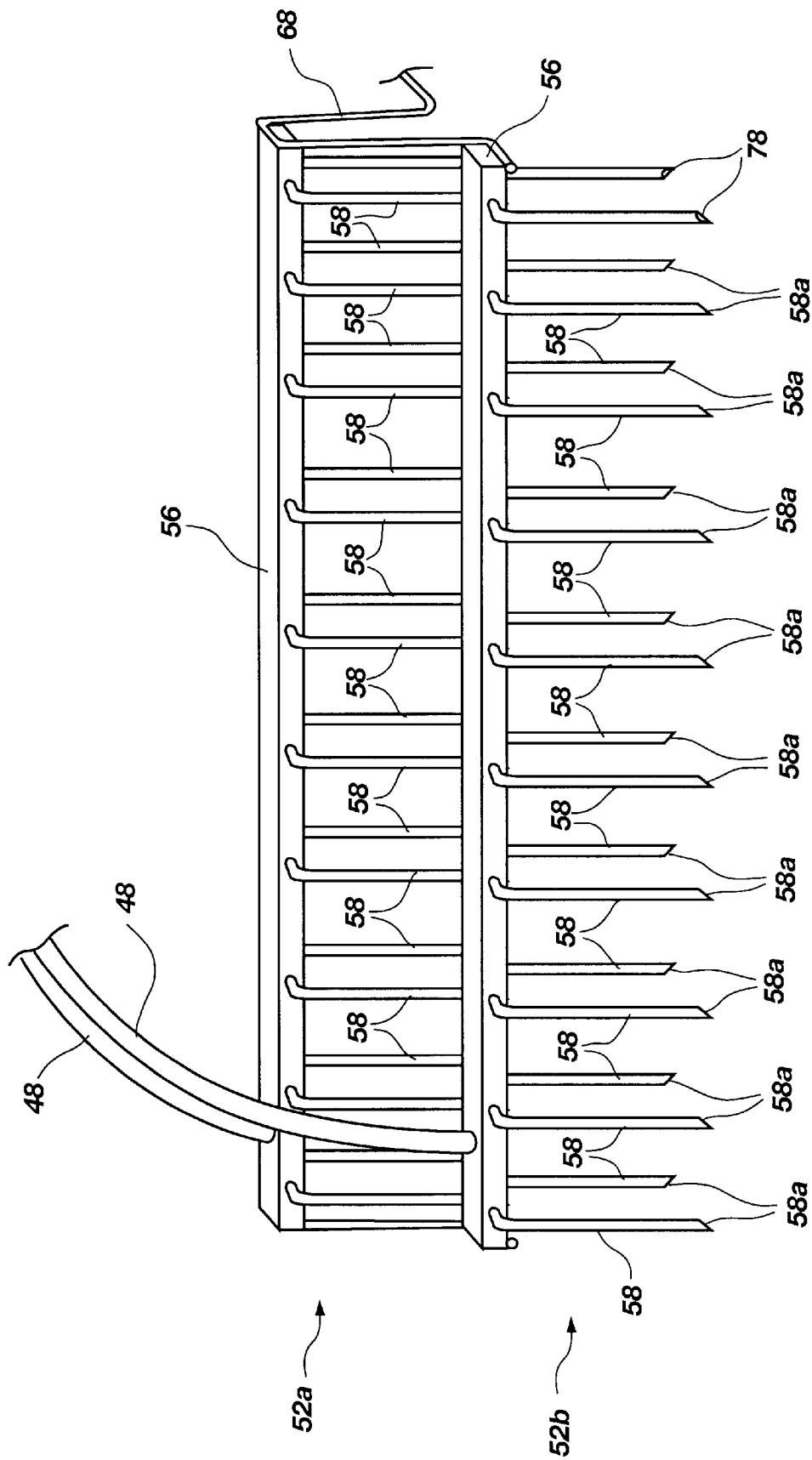
FIG. 2 shows a close-up perspective view of an injector spike assembly such as those used on the dew simulator shown in FIG. 1.

Referring now to FIG. 2, there is shown a close-up, fragmented view of a pair of injector assemblies 52. The injector assemblies 52 are connected to hoses 48 which are in turn connected to the steam manifold 44 (FIG. 1) for supplying steam. The injector assemblies 52 include a plurality of injector spikes 58 disposed along the channeling tube 56. The channeling tube 56 may be round or square in cross-section (as shown in FIG. 2), but is generally hollow within so as to channel steam to the injector spikes 58. The injector spikes 58 are preferably disposed at seven inch intervals, although other spacings may be used, and extend from both sides of the channeling tubes 56.

The injector assemblies 52 are typically attached to a crankshaft 68 so that adjacent injector assemblies are spaced so as to move in a counter-cyclic arrangement, i.e, a first injector assembly 52a moves upward in the windrow (not shown) as the adjacent second injector assembly 52b moves downward. The injector spikes 58 are typically about 18–24 inches long so that they may reach deep into the windrow. The length of the injector spikes 58 and their piston-like action ensure that a windrow of hay is fully permeated with steam. This is in contrast to the prior attempts at steam treatment which only treat the outside of the windrow or the underside with steam. As will be appreciated by those skilled in the art, such methods of application result in uneven moisturization of the hay, and may result in some hay receiving excess moisture, while other hay receives none at all.

When using the present invention, the steam is released throughout the windrow by the moving injector spikes 58, thereby ensuring consistent moisture absorption by the hay. Thus, the producer may regulate moisture content to ensure that all of the hay baled meets the moisture requirements for shipping the hay to lucrative high grade feed markets. Presently producers are only able to sell about 30 percent of their hay yield to such markets because of the inconsistency in moisture content of the hay. By using the present invention, it is anticipated that 90 percent or more of the producer's yield will meet the moisture content standards for shipping to the these lucrative foreign and domestic markets.

Referring now to FIG. 3, there is shown a dew simulator 10 disposed between a tractor 104 and a baler 108. As is apparent from FIG. 3, the tractor is a conventional tractor and is driven along side of the windrow 112. The tractor 104 is attached to the dew simulator 10 by a hitch 88 and the PTO shaft 90. The PTO shaft 90 passes under the dew simulator 10 and connects to the baler 108 so as to provide power to the baler.

As the tractor 104 is driven along the windrow 112, water provided from the water supply tank 14 is turned to steam in the steam generator 22. The steam is then passed through the steam flow hose 36 and the steam regulator 40 into the steam manifold 44. From the steam manifold 44, the steam passes into the injector assemblies (not shown in FIG. 3) and into the windrow 112 of hay.

The steam is injected into the windrow 112 at a rate of between about 1 and 100 pounds of steam for every ton of hay, and typically between 30 and 100 pounds in dry climates. The exact amount within this range is determined by the moisture content of the hay prior to application of steam. The hay 112a is then given between 2 and 6 seconds (depending on the speed at which the tractor is traveling) to cool prior to being picked up by the baler 108. The 2 to 6 seconds also allows the steam to be more completely absorbed by the hay, although the majority of the steam will be absorbed almost instantaneously.

The baler 108 may be any conventional type of baler, such as the side loading type shown in FIG. 3. Center loading balers may also be used with a slightly modified version of the dew simulator 10 which is discussed with respect to a subsequent figure.

The baler 108 collects the hay from the windrow 112 and compacts the hay into bales, such as that shown at 116, passing out of an exit chute 120 on the baler. In a preferred embodiment, a moisture sensor 124 is disposed along the exit chute 120 or some convenient place on the baler 108 to continually measure the moisture content of the hay. Such sensors are well known to those skilled in the art. One common sensor uses impedance to determine the moisture content of the hay.

Instead of simply taking readings of the hay moisture content, however, the moisture sensor 124 is connected by electronic or other means to the steam regulator valve 40 which is disposed on the dew simulator 10 at the head of the steam manifold. The steam regulator valve 40 is responsive to readings of the moisture sensor 124, or can be manually controlled from the tractor 104, so that the person operating the tractor can make adjustments in light of the moisture sensor. Thus, if the moisture sensor 124 indicates that the moisture content of the hay is less than desired, the steam regulator valve 40 is modified to increase the amount of steam which is supplied to the steam manifold 44 and thus the injector assemblies 52 (FIGS. 1 and 2). Thus, instead of setting the steam regulator 40 at a given setting, the moisture sensor 124 allows a variable amount of steam to be injected and allows continual fine tuning. It will be appreciated that such adjustments are particularly valuable when the hay is being baled in the morning, when moisture content is continually dropping as the dew evaporates, or in the evening, when moisture content increases as dew condenses in the cooling air.

While shown in FIG. 3 as being disposed on the baler 108, the moisture sensor 124 could be disposed on the dew simulator 10 so as to monitor the hay before steam is injected into the windrow. While such a position would be advantageous as little if any hay would receive excess amounts of moisture, monitoring the moisture content of the windrow would usually be more difficult than the conventional practice of monitoring the bales.

Because adjustments can be made, and the hay can be moisturized at any convenient time, the present invention removes the need to bale hay during the brief window when dew condensation is increasing the moisture content of the hay. This, in turn, eliminates the need for producers to purchase large amounts of machinery which remain idle for most of the year.

Figure 4:
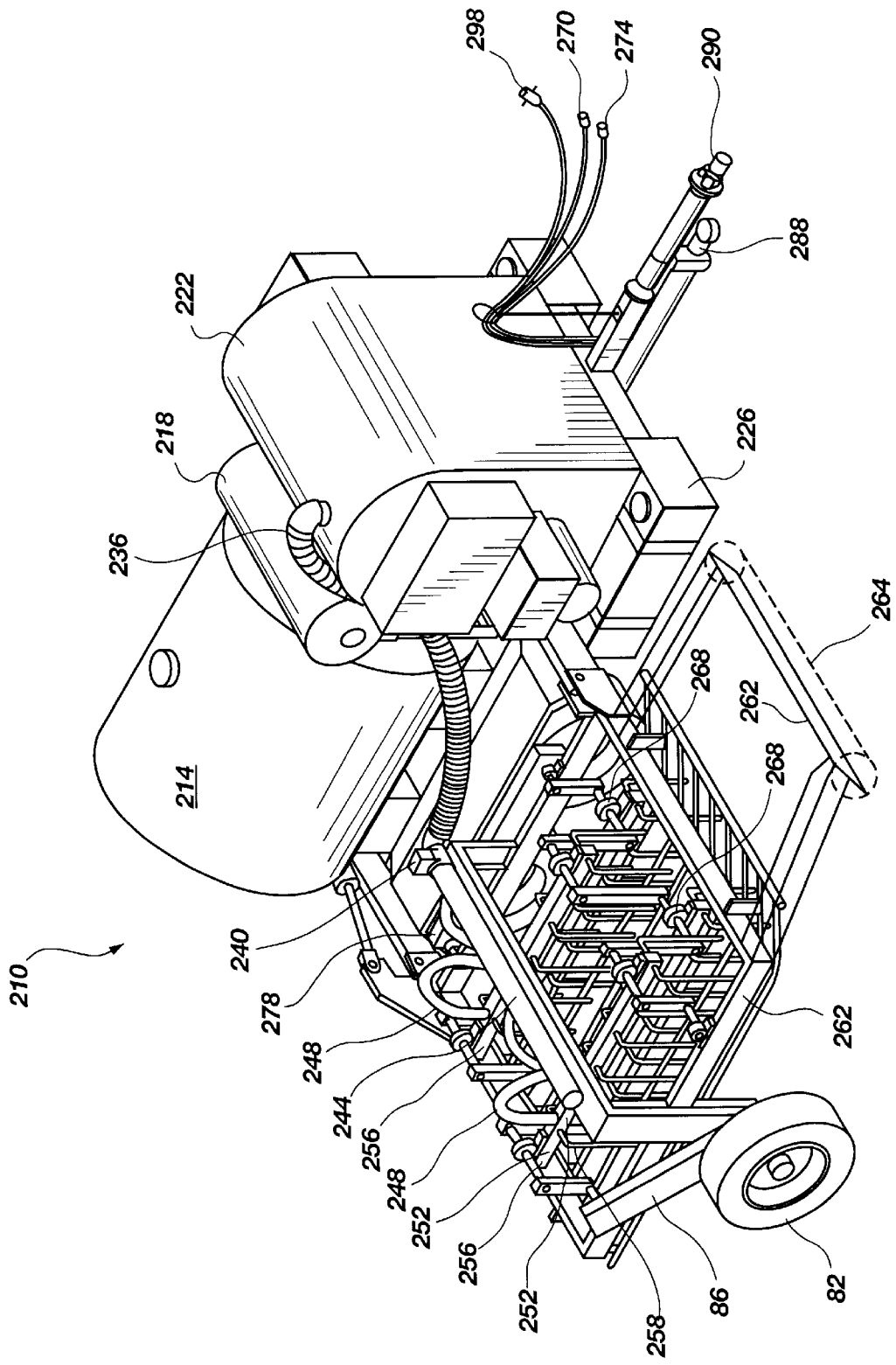
FIG. 4 shows an alternate embodiment of a dew simulator made in accordance with the present invention.

Referring now to FIG. 4, there is shown another embodiment of the invention. The dew simulator 210 includes a water supply tank 214, a boiler feedwater system 218 and a steam generator 222 in a similar manner as the embodiment discussed in FIGS. 1 and 3. Also present are the fuel tank 226, the steam flow hose 236, the steam regulator valve 240, the steam manifold 244 and the injector assemblies 252 including channeling tubes 256 and injector spike 258, and other structures analogous to those discussed with respect to FIG. 1. The primary difference between the dew simulator 210 shown in FIG. 4 and the dew simulator 10 shown in FIG. 1 is that a compressing plate 262 or roller (shown as dashed line 264) extends from the frame 262 to compact the windrow (not shown) prior to the injection of steam by the injector assemblies 252.

By using the compressing plate 262 or roller 264, the windrow (not shown) can be compressed to a much smaller volume. For example, a common height for windrows is about 2 feet. By using the compressing plate 262 or roller 264, the windrow can be compacted down to about 1 foot tall, thus reducing the volume of the windrow by about 50 percent. The smaller volume of the windrow, in turn, decreases the amount of steam which is necessary to permeate the windrow and provide the needed moisture to the hay. When the windrow has not been compressed, a substantial amount of steam quickly passes out of the windrow. When compressed, however, the windrow is better at retaining the steam, and is able to be moisturized with less steam being added. As will be appreciated by those skilled in the art, the less steam that is required to moisturize the hay in the windrow, the less often stops must be made for water, and the less fuel will be required to turn the water into steam.

While in FIG. 4 the compressing plate 262 or roller 264 is attached to the frame 262 of the dew simulator 210, the hay of the windrow could be compressed by an attachment to the tractor, or other device separate from the dew simulator.

Figure 5:
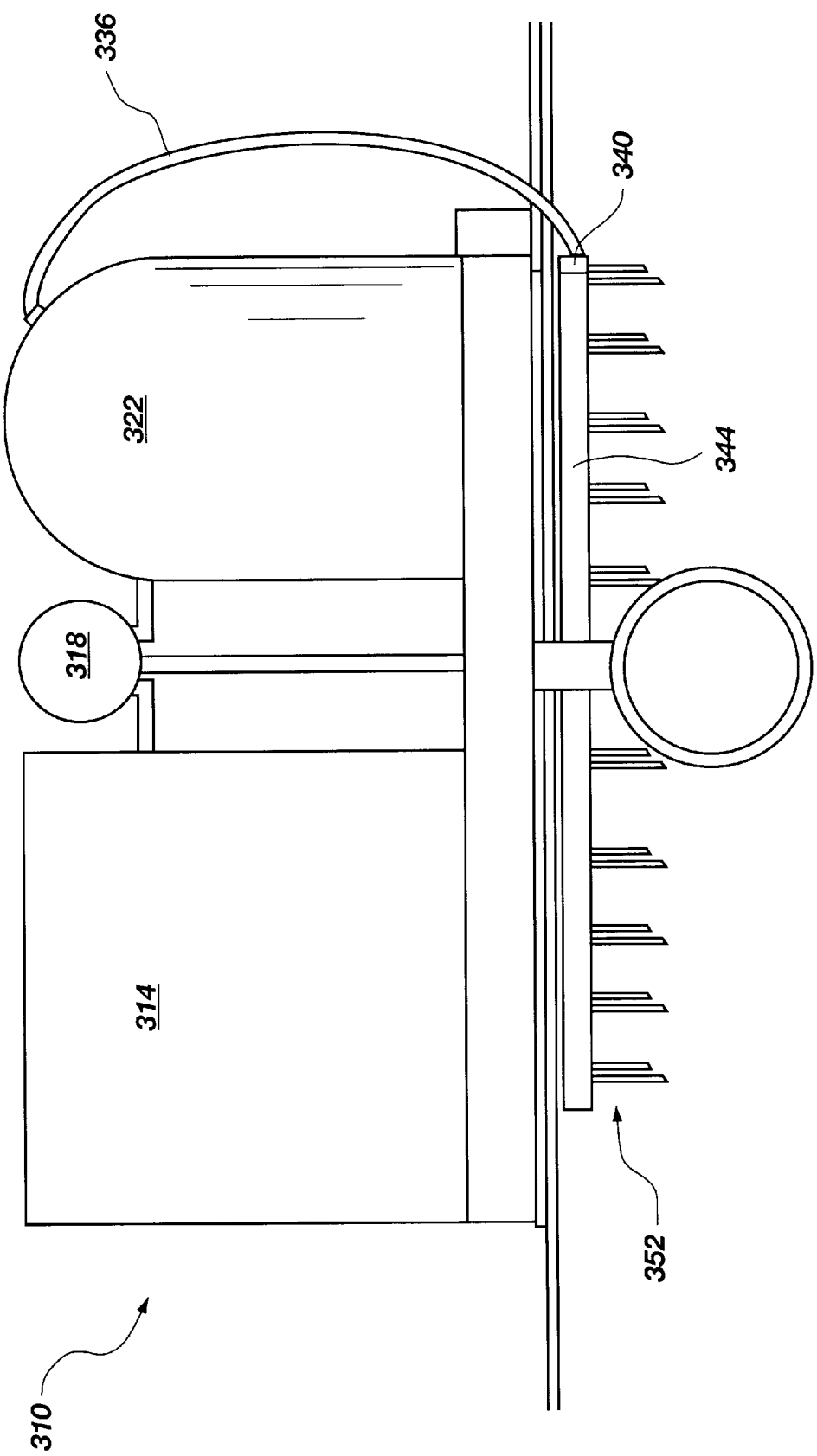
FIG. 5 shows yet another embodiment of a dew simulator made in accordance with the teachings of the present invention.

Referring now to FIG. 5, there is shown a side view of another embodiment of the present invention. The dew simulator 310 includes a water supply tank 314 with a boiler feedwater system 318 and a steam generator 322 similar to that shown in the embodiment of FIG. 1. The steam flow hose 336 is attached to the steam regulator valve 340 and steam manifold 344. However, instead of the steam manifold 344, injector assemblies 352, etc, being disposed in a frame extending outwardly from the portion of the dew simulator 310 carrying the water supply tank 314, the injector assemblies are disposed beneath the water supply tank.

The embodiment shown in FIG. 5 is designed for use with center loading balers. Those skilled in the art will appreciate that the embodiments shown in FIGS. 1 through 4 would be awkward to use with a center loading baler. However, by positioning the injector assemblies 352 below the water supply tank 314, steam generator, etc., the dew simulator 310 can be conveniently used with center load balers.

In use the embodiment shown in FIG. 5 would be substantially the same as the embodiments previously discussed. If a compacting plate or roller (such as plate 262 or roller 264 in FIG. 4) were desired, the plate or roller could be attached to the dew simulator 310 or to the tractor, in that in such an embodiment, the tractor will pass directly over the windrow.

Figure 6:
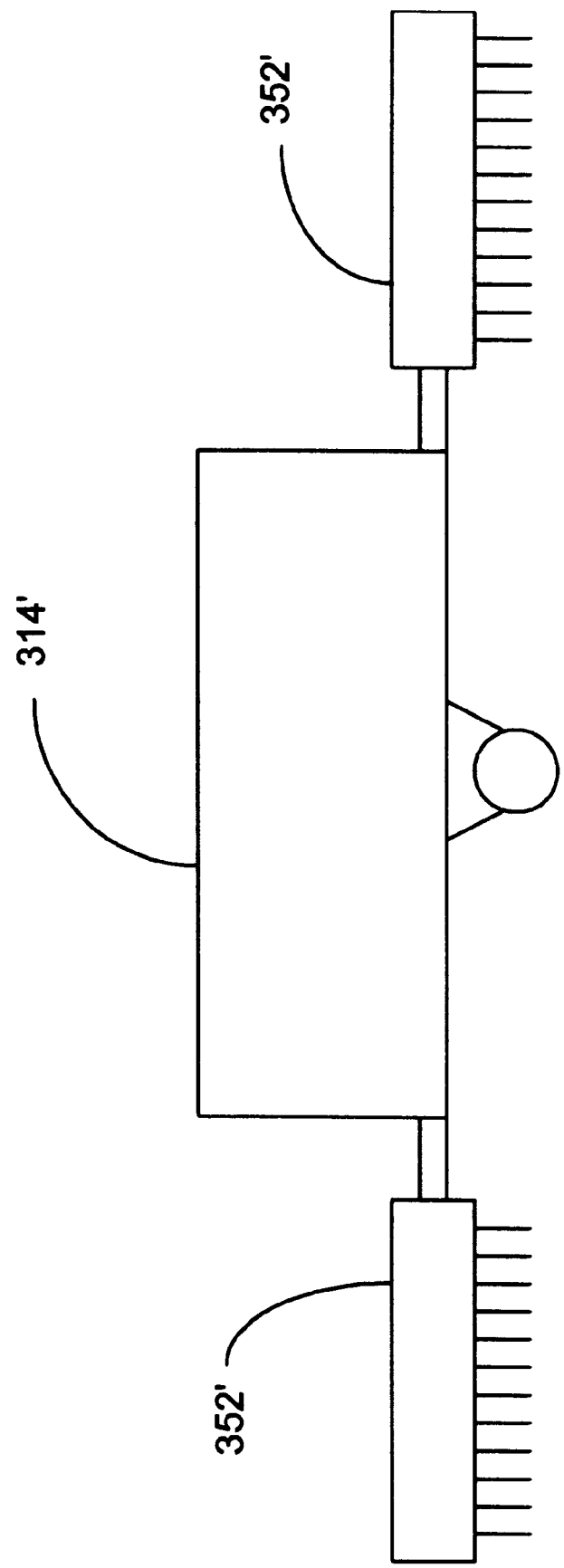
FIG. 6 shows additional embodiments of a dew simulator made in accordance with the principles of the present invention.

As shown in FIG. 6, the injector assemblies 352' can also be positioned in front of and/or behind the water tank 314' water tank, etc. However, those familiar with farming hay will recognize that such an arrangement can add considerable length to the machinery.

Thus there is disclosed a method and device for improving hay production. Unlike the prior art steam treatment systems which required the hay to be deposited in a steam chamber for a given amount of time to permeate the windrow, the present invention obtains almost instantaneous permeation of the windrow with steam so as to provide even moisturization of the hay, while at the same time maintaining the speed of conventional baling systems. Furthermore, the hay is more evenly moisturized, so as to minimize the risk of spoilage of some hay and inadequate moisturization of other hay.

Those skilled in the art will be familiar with numerous different modifications which could be made to the disclosed embodiments without departing from the scope or spirit of the present invention. The appended claims are intended to cover such modifications.

What is claimed is:

1. A method for for moisturizing cured hay formed in a windrow on the ground at a desired moisture content, the method comprising:

a) monitoring the moisture content of the hay;

b) positioning an injector means within the hay of the windrow on the ground; and c) injecting sufficient steam into the windrow through an injector means so as to achieve a desired moisture content in the hay.

2. The method according to claim 1, wherein the method further comprises compressing the windrow prior to injection of steam.

3. The method according to claim 1, wherein step (b) comprises, more specifically, moving the injector means within the windrow so as to evenly distribute steam throughout the windrow.

4. The method according to claim 3, wherein step (b) comprises more specifically, moving the injector means up and down in a piston-like pattern, and wherein the injector means comprises a plurality of injector spikes disposed in a horizontal row, so as to evenly distribute steam within the windrow.

5. The method according to claim 4, wherein the method further comprises positioning a plurality of rows of injector spikes adjacent one another.

6. The method according to claim 4, wherein adjacent rows of injector spikes are disposed in a counter-cyclic arrangement such that as one row of spikes travels generally upward through the windrow, an adjacent row of spikes travels generally downward through the windrow.

7. The method according to claim 1, wherein the method further comprises continually monitoring the moisture content of the hay and adjusting the amount of steam emitted by the injector means so as to maintain a generally consistent moisture content after injection of the steam into the windrow.

8. The method according to claim 7, wherein the method further comprises:

d) allowing the hay to cool for about 2 to 6 seconds after injection of the steam; and e) baling the hay.

9. The method according to claim 1, wherein the method comprises emitting between about 30 and 100 pounds of steam per ton of hay harvested.

10. A dew simulator for use while harvesting hay placed in a windrow having an exterior and an interior, the simulator comprising:

steam generation means for generating steam;

steam injection means connected to the steam generation means for receiving steam from the steam generation means and for injecting steam into the interior of the windrow so as to moisturize the hay in the windrow; and means for moving the steam injection means within the hay of the windrow.

11. The dew simulator of claim 10, wherein the dew simulator further comprises steam regulation means for controlling the amount of steam injected into the windrow by the steam injection means.

12. The dew simulator of claim 11, further comprising monitoring means for monitoring the moisture content of the hay, the monitoring means being disposed in communication with the steam regulation means.

13. The dew simulator of claim 10, wherein the injection means comprises a plurality of steam channeling tubes, each of said channeling tubes having a plurality of steam injector spikes extending downwardly therefrom.

14. The dew simulator of claim 13, wherein the steam channeling tubes are connected to crankshafts disposed so as to selectively raise and lower said steam channeling tubes.

15. The dew simulator of claim 14, wherein the steam channeling tubes are disposed along the crankshafts in an alternating arrangement, such that when a first steam channeling tube moves upward, a second channeling tube, adjacent the first channeling tube, moves downward.

16. The dew simulator of claim 14, wherein the dew simulator travels at a variable speed, and further comprises timing means disposed in communication with the crankshafts so as to synchronize movement of the crankshafts with the speed at which the dew simulator is travelling.

17. The dew simulator of claim 14, wherein the dew simulator further comprises a frame for holding the steam channeling tubes, and hydraulic means for raising and lowering the frame during transport and baling.

18. The dew simulator of claim 10, wherein the dew simulator further comprises a compressing means for compacting the windrow prior to injection of steam by the injection means.

19. The dew simulator of claim 10, wherein the dew simulator comprises a water supply tank connected to the steam generator, and wherein the injection means is disposed at a lateral side of the water supply tank.

20. The dew simulator of claim 10, wherein the dew simulator comprises a water supply tank connected to the steam generator, and wherein the injection means is disposed beneath the water supply tank.

21. The dew simulator of claim 10, wherein the dew simulator comprises a water supply tank connected to the steam generator, and wherein the injection means is disposed rearward of the water supply tank.

22. A hay harvesting system comprising the dew simulator of claim 10, and further comprising:

tractor means for pulling the dew simulator; and baling means attached to the dew simulator for baling hay moisturized by the dew simulator.

23. The hay harvesting system of claim 22, wherein the dew simulator comprises means for adjusting the amount of steam injected into the windrow, and further comprising a moisture sensing means disposed on the baling means for monitoring moisture content in the hay.

24. The hay harvesting system of claim 23, wherein the moisture sensing means disposed on the baling means is connected to the means for adjusting the amount of steam, said means being responsive to the moisture sensing means for maintaining a desired moisture content in the hay.

25. A method for moisturizing a windrow of cured hay to achieve a desired moisture content within the hay, the windrow having an outer portion and an inner portion, and the method comprising:

a) monitoring the moisture content of the hay;

b) positioning an elongate injector means within the hay of the windrow; and c) injecting sufficient steam into the inner portion windrow through an injector means so as to achieve a desired moisture content in the hay.

\* \* \* \* \*